United States Patent [19]

Stengelin

[11] Patent Number: 4,687,431

[45] Date of Patent: Aug. 18, 1987

[54] MOLD PRESS HAVING A MOLD CLEANING DEVICE

[75] Inventor: Ernst Stengelin, Neuhausen, Fed. Rep. of Germany

[73] Assignee: Klöckner Ferromatik Desma GmbH, Malterdingen, Fed. Rep. of Germany

[21] Appl. No.: 837,686

[22] Filed: Mar. 10, 1986

[30] Foreign Application Priority Data

Mar. 30, 1985 [DE] Fed. Rep. of Germany ....... 3511797

[51] Int. Cl.⁴ .............................................. B29C 33/72
[52] U.S. Cl. ......................... 425/229; 425/DIG. 116; 164/158
[58] Field of Search ............... 425/225, 227, 228, 229, 425/DIG. 116; 164/158

[56] References Cited

U.S. PATENT DOCUMENTS

| 784,470 | 3/1905 | Church | 425/228 |
|---|---|---|---|
| 3,010,173 | 11/1961 | Culver | 425/227 |
| 3,801,251 | 4/1974 | Coscia | 425/229 |
| 4,512,810 | 4/1985 | Gahlinger | 164/158 |
| 4,543,684 | 10/1985 | Bandoh et al. | 164/158 |

FOREIGN PATENT DOCUMENTS

| 1025772 | 3/1958 | Fed. Rep. of Germany ... 425/DIG. 116 |
| 1182127 | 11/1964 | Fed. Rep. of Germany ... 425/DIG. 116 |
| 2133748 | 4/1983 | Fed. Rep. of Germany . |
| 0187823 | 10/1984 | Japan ................................. 425/225 |
| 581642 | 10/1946 | United Kingdom . |
| 983094 | 2/1965 | United Kingdom ................ 164/158 |

Primary Examiner—Willard E. Hoag
Attorney, Agent, or Firm—Watson, Cole, Grindle & Watson

[57] ABSTRACT

A mold press having a mold cleaning device with a rotary brush mounted on an arm adjustable for cleaning in directions parallel to the mold surface, toward and away therefrom, and in a wiping motion relative to the surface.

8 Claims, 4 Drawing Figures

MOLD PRESS HAVING A MOLD CLEANING DEVICE

BACKGROUND OF THE INVENTION

This invention relates to a mold press for the production of molded workpieces of rubber or plastic material employing a two-part mold and a cleaning device in combination with the mold press for cleaning a mold surface and for ejecting the workpieces. The mold press and attached cleaning device may be disposed upright so that the two mold halves may be separated horizontally, or may be disposed horizontally so that the mold halves may be vertically separated. A cleaning brush of the device is capable of adjustment parallel to the mold surface, and can extend in between the two separated mold halves.

A mold press with a cleaning device thereon is disclosed, for example, in West German Pat. No. 21 33 748. This cleaning device has a roller brush which can be rolled along the mold surface of one mold half, and may then be rolled along the mold surface of the opposite mold half by means of a horizontal guide, for cleaning of the mold surfaces thereby being effected and for ejecting the molding workpieces. However, this device suffers from the disadvantage in that only a portion of the mold surface can be cleaned because the roller, together with its roller support, must be smaller than the space between the two upper centering pins which are employed for centering the mold halves when closed. Thus, a portion of the mold surface becomes inaccessible for cleaning, and/or the mold surface cannot have mold pockets since they cannot be cleaned. Moreover, cleaning cannot be effectively carried out with a brush roller which moves up and down with a rolling motion of the brush. And, a roller brush of this type is incapable of protruding into the mold pockets such that these pockets may never be cleaned with this type of roller brush. The centering pins of the mold halves also present obstacles for the roller brush.

A mold press having horizontally disposed molds for the production of molded plastic workpieces, is likewise generally known, as for example disclosed in British Pat. No. 581,642. This apparatus includes a horizontal continuous conveyor which serves several work stations. The halves of the two-part mold are connected by hinges, and are transported on the conveyor. In an open position, the lower mold half rests on the conveyor and the upper mold half lies at a 90° angle (or vertical) to the conveyor.

For cleaning the mold halves, two stations are required, one for the horizontal mold half and one for the upright mold half. The cleaning device for the horizontal mold half includes a rod having at its end a cross support for four rotating cleaning brushes which clean the mold pockets. The second cleaning station also has such a rod, at the end of which a horizontal rod with cleaning brushes for the vertical mold half is arranged.

Apart from the two cleaning stations, the apparatus also has two removal stations for the workpieces, each also with a rod. The latter is provided with a suction bell.

The cleaning and removal stations are essentially the same in that the rod for each is connected to a piston rod of an operating cylinder such that the rod can be rotated through 90° from the working position.

The disadvantage with such an apparatus is that two separate cleaning and two separate removal stations are required, thereby significantly adding to the cost. Moreover, no optimum cleaning of the surfaces of the mold halves is possible since the brushes can only be inserted between the mold halves at a certain position, and the cleaning brushes cannot be pivoted for extension into the mold pockets. The cleaning of the entire mold surface is therefore not made possible. This apparatus is only employed for molds which are hinged together, and the cleaning as well as the injection operations are not timed to the operations of an injection molding machine.

SUMMARY OF THE INVENTION

It is therefore an object of the present invention to avoid the aforedescribed disadvantages of the prior art by the provision of a mold press having a mold cleaning device capable of cleaning the mold surface of a mold half by the provision of a rotary brush capable of being moved about substantially the entirety of the mold surface for selectively or entirely cleaning such surface, the brush being movable toward and away from the mold surface so as to avoid any obstructions such as the centering pins on the surface during cleaning, permits the brush to extend fully into the mold pockets located in the mold surface, and facilitates ejection of the molded workpieces.

Mold parts of the mold press of the invention may be disposed upright for separation in a horizontal direction, or may be disposed horizontally for separation in a vertical direction.

More specifically, the present mold cleaning device of the mold press is mounted on a side wall of one of the mold parts which side wall lies perpendicular to the front surface of a movable clamping plate on which the mold half is mounted. The cleaning device has an elongated guide which extends parallel to such front surface, a movable guide plate on this guide, and means for adjusting the position of the guide plate along the guide. A shaft extends from the guide plate and is pivotable about its axis which lies parallel to the side wall of the mold part. Means are provided for rotating this shaft about its axis, and a brush supporting arm is mounted on the shaft for pivotal movement together therewith and for pivotal movement about an axis which lies perpendicular to the shaft axis. A rotatable plate brush is mounted on the arm with means provided for rotating the brush about its central axis. A holder is mounted on the shaft for pivotal movement together therewith, and extendable means interconnect the holder with the arm for pivoting the arm about that axis which lies perpendicular to the shaft axis so as to move the brush toward and away from the mold surface.

Other sub-features of the invention are set forth in the accompanying claims.

And, other objects, advantages and novel features of the invention will become more apparent from the following detailed description of the invention when taken in conjunctin with the accompanying drawings.

Figure 3:
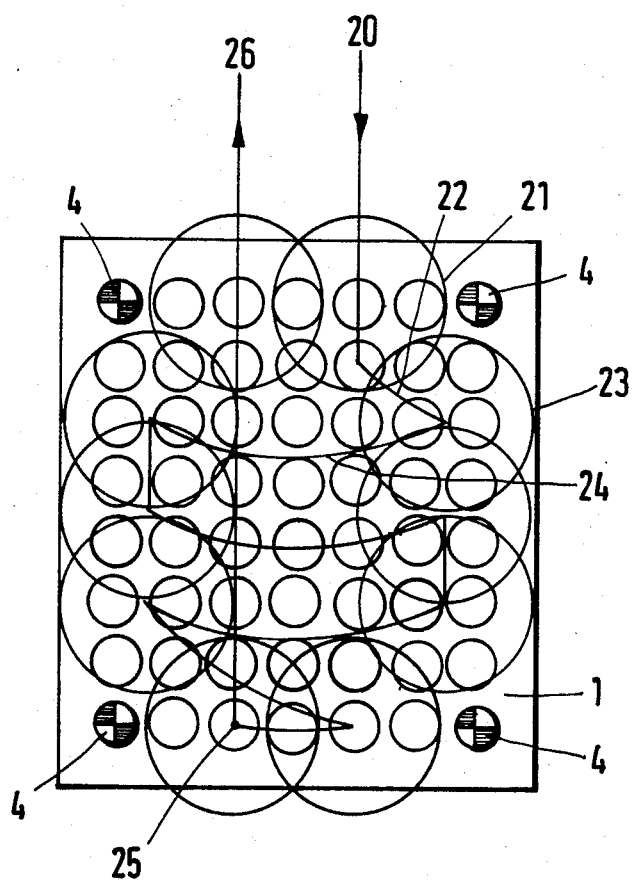
FIG. 3 is a plan view of the mold surface of a mold half schematically showing the path of the rotary brush center as it moves about the mold surface during cleaning.

A view similar to FIG. 3 showing the brush path for the selective cleaning of four mold pockets.

DETAILED DESCRIPTION OF THE INVENTION

Figure 1:
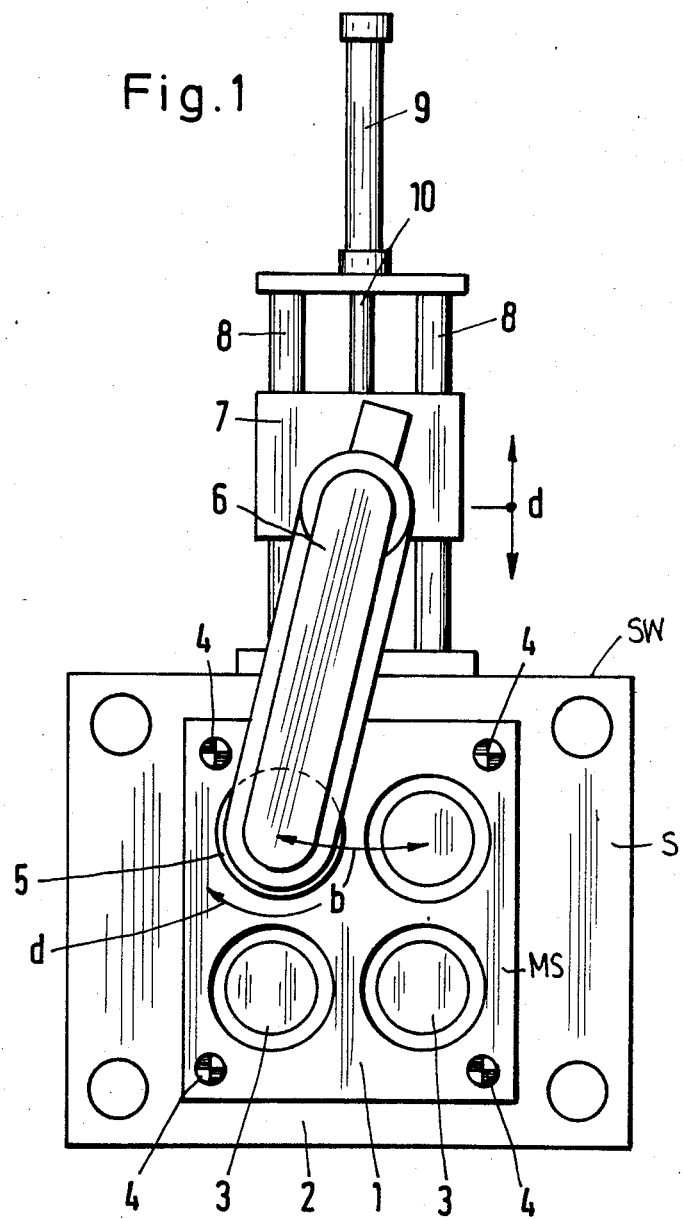
FIG. 1 is a schematic illustration, in plan view, of a mold half of a mold press having a mold cleaning device according to the invention for cleaning the mold surface of the mold half.
Figure 2:
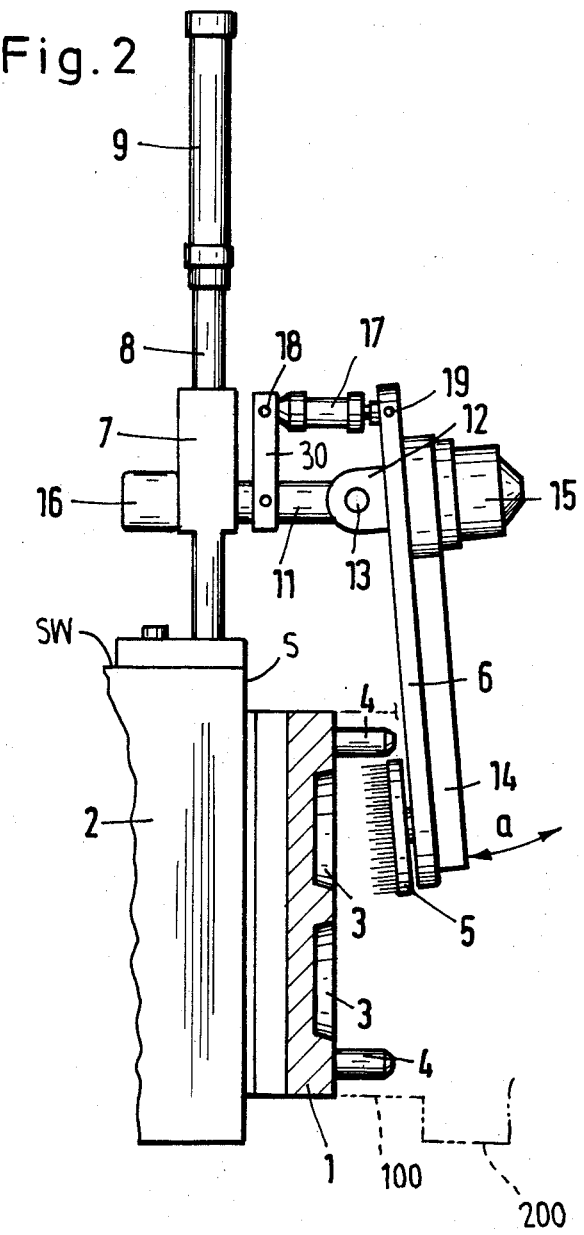
FIG. 2 is a side elevational view of the press of FIG. 1, showing the mold half in section.

Turning now to the drawings wherein like referenced characters refer to like and corresponding parts throughout the several views, only those portions of a mold press are illustrated in FIGS. 1 and 2 which are necessary for describing the invention. Thus, the press includes a pair of relatively movable mold parts for the production of molded workpieces of rubber or plastic, each of the parts comprising a movable clamping plate 2 and a mold half 1 mounted in any normal manner on a front surface F of the clamping plate. The matching opposing mold half 100 is shown in phantom outline in FIG. 2 as similarly mounted on the front surface of its movable clamping plate 200, the two mold halves being separated in some normal manner in a horizontal direction with the cleaning device of the invention which will be described. Of course, during the injection molding operation, the two mold halves are moved together for the production of the molded workpieces of rubber or plastic as the plasticized molding material is injected in some typical manner into mold pockets 3 located in at least mold half 1. These pockets are formed by recesses which form a mold surface MF with the remainder of the exposed surface of the mold half to be cleaned.

In order to assure precise registration between the two mold haves, mold half 1 is typically provided with four centering pins 4 extending from its surface for engagement with four centering recesses (not shown) in the opposite mold half.

The mold surface, which includes its pockets 3, is cleaned by the provision of a rotary plate brush 5 which may be of circular configuration, attached to a brush supporting arm 6. The brush is mounted at one end of the arm for rotation about its central axis in some normal manner. The arm is mounted for swinging movement in the direction of arrow b of FIG. 1 so that the outer surface of mold half 1 can be effectively cleaned by a back-and-forth wiper motion as the plate brush rotates. During this back-and-forth motion the arm may be stopped such that the brush lies coaxially with a mold pocket 3 for the cleaning thereof during brush rotation, as shown in the FIG. 1 position.

Arm 6 is mounted on a transverse guide plate 7 which is capable of being adjusted along the length of a pair of parallel, elongated and spaced guide rods 8 such that the brush can be moved from one pocket 3 to the other for cleaning, and can be moved about the remaining mold surface MS having no mold pockets.

A piston and cylinder unit, hydraulic or pneumatic, is provided as having its cylinder 9 mounted on a crossbar at the free end of guide rods 8, and having its piston 10 connected to guide plate 7. Upon operation of the piston and cylinder unit causing the piston to extend and retract relative to its cylinder, the position of guide plate 7 may be adjusted along the guide rods for correspondingly shifting the rotary brush. This adjusting movement is illustrated by the double arrow c of FIG. 1, and the rotary movement of the brush is illustrated by the curved arrow d in this Figure.

The guide rods are mounted in any normal manner on a side wall SW of clamping plate 2, this side wall lying perpendicular to front surface S thereof. Otherwise, the guide rods may be similarly mounted on a side wall of mold half 1 which lies perpendicular to surface S, without departing from the invention.

A shaft 11 extends from guide plate 7 and is pivotable about its central axis. A bracket 12 on arm 6 is attached to shaft 11 by means of a crossbolt 13 such that arm 6 is mounted on the shaft for rotary movement together with the shaft, and for pivotal movement about the axis of bolt 13 which lies perpendicular to the shaft axis. The arm together with its attached brush are therefore pivotable about the axis of bolt 13 in the direction of the curved double arrow a of FIG. 2, toward and away from mold surface MS of mold half 1.

The cleaning brush may be driven by an endless belt 14, which may be internally toothed, and operatively extending in a conventional manner between the drive part (not shown) of the brush and a drive motor 15. Both the drive motor and belt are mounted on a side of the arm opposite the side on which the brush is mounted.

Another drive motor 16 is mounted on guide plate 7 coaxial to shaft 11 and operatively connected thereto for rotating the shaft about its central axis. Upon operation of motor 16, arm 6 and its brush are swung in the direction of double arrow b (FIG. 1). And, a bracket 30 is mounted on shaft 11 for rotary movement together therewith about the shaft axis, and a small piston and cylinder unit 17 extends between bracket 30 and arm 6 on a side of shaft 11 opposite the brush. The cylinder of unit 17 is pivotally mounted as at 18 to bracket 30, and the piston of this unit is pivotally mounted as at 19 to the arm. Upon operation of unit 17, the arm and its brush may be moved about the axis of bolt 13 in the direction of double arrow a. Thus, the arm may be shifted so that the brush avoids impacting against one of the centering pins 4 which thereby present no obstacle for the cleaning device. And, the brush may be easily shifted without obstruction between upper and lower centering pins for completely cleaning the area therebetween.

In FIG. 3, the path of the geometric center of the brush is illustrated when it is desired to clean the outermost mold surface of a mold half. During such a surface cleaning, it is not the mold pocket, but rather the exterior surface of the mold half which is cleaned to the extent required between individual mold pockets as well as adjacent the surrounding area. During such a surface covering cleaning, the brush does not extend into the mold pockets. Such a cleaning process is known as positional brushing, since only a certain portion is cleaned. There is no pivotal movement of the arm and its brush in the direction of double arrow a which is otherwise employed for the cleaning of the mold pockets.

For a surface covering brushing, the center of the brush moves, for example, in the direction of arrow 20 such that the brush first cleans the surface under a circle 21, the brush center is then moved to the right shown in this Figure according to path 22 such that it cleans the surface with circle 23. The path of the center of the brush then follows path 24 to position 25, so that the brush is then moved out of the space between the two mold halves in the direction of arrow 26, such that the circular area lying adjacent circle 21 is cleaned last during this operation.

Figure 4:
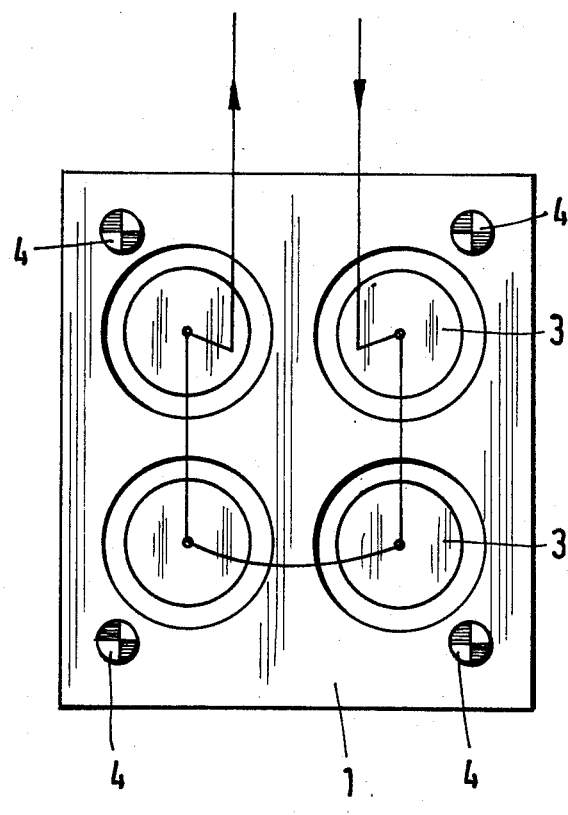

In FIG. 4, corresponding arrows show the manner in which the center of the brush is moved for cleaning a mold half having four mold pockets for effecting a so-called positioned cleaning.

Arm 6 may have more than one brush 5 without departing from the invention. And, the invention operation is not illustrated nor is the ejection of the workpieces shown although such can be gathered from known devices. The three degree freedom of movement of the cleaning arm and its brush, i.e., long guide rods 8, about the axis of shaft 11, and about the axis of bolt 13, permits the brush to be moved about substantially the entirety of the mold surface for selectively or entirely cleaning the mold surface and the mold pockets, the brush avoiding any obstructions on the surface during cleaning, and facilitating ejection of the molded workpieces.

The mold press having the cleaning device of the invention has been illustrated in FIGS. 1 and 2 as vertically upright, although the pressing and cleaning device could be disposed horizontally without departing from the invention. And, the aforedescribed cleaning device may likewise be mounted on the clamping plate or the mold half of the opposing movable mold part for the cleaning of the mold surface thereof.

In accordance with the invention, essentially the entire mold surface of each mold half can be effectively cleaned whether or not the mold half has a centering pin. Pivotal movement of the brush support arm toward and away from the mold surface avoids any obstruction with the centering pins, and the rotary brush may simply be guided around each centering pin for cleaning the area closely adjacent thereto. The rotary plate brush can therefore cover a considerably larger area compared to a roller cleaning brush.

Within the pivoting range of the arm, the cleaning effect also is considerably more thorough compared to a roller brush, since an overlapping of cleaning areas is made possible as described with reference to FIG. 3. Moreover, the arm with its rotatable brush can be moved toward any critical position on the mold surface and maintained in such position until fully cleaned, such as coaxial to a mold pocket. Thus, by thoroughly cleaning especially the mold pockets, ejection of the molded workpieces, in the normal manner, may be carried out in a more efficient and expeditious manner without sticking to the mold pockets after the mold is opened.

Moreover, the cleaning operation in accordance with the present arrangement saves considerable time if the mold halves are opened sufficiently far apart such that they can be cleaned simultaneously. The cleaning device is of simple and sturdy construction allowing for a three degree freedom of movement of the arm and its cleaning brush. And, the individual components of the device may be easily and quickly replaced so that the device is made repair friendly.

The capability of moving a brush toward and away from the mold surface to be cleaned permits the application of a certain amount of pressure on the rotating brush during the cleaning process so as to thereby improve the cleaning effect. And, the movement of the brush in the direction of the arrows a, b, and c, results in optimum cleaning conditions at reduced cleaning time.

Obviously, many other modifications and variations are made possible in the light of the above teachings. It is threfore to be understood that within the scope of the appended claims the invention may be practiced otherwise than as specifically described.

What is claimed is:

1. In a mold press having a pair of relatively movable mold parts for the production of molded workpieces of rubber or plastic, each of said mold parts comprising a movable clamping plate and a mold half mounted on a front surface thereof, a mold cleaning device fixedly mounted on a side wall of one of said mold part, said side wall lying perpendicular to said front surface thereof, said device comprising elongated guide means extending parallel to said front surface thereof, a guide plate mounted on said guide means for sliding movement toward and away from said side wall and in a direction parallel to said front surface, means for adjusting the position of said guide plate along said guide means, a shaft transversely extending from said guide plate and pivotable about its central axis which lies perpendicular to said front surface, means for swinging said shaft about said axis thereof, a brush supporting arm mounted on said shaft for swinging movement together therewith about said shaft axis and for pivotal movement about an axis perpendicular to said shaft axis, a rotatable disc brush mounted on said arm for rotation about an axis parallel to said shaft axis and perpendicular to said front surface, means for rotating said brush about said axis thereof, a holder mounted on said shaft for swinging movement together therewith, and axially extendable means interconnecting said holder with said arm for pivoting said arm about said axis which lies perpendicular to said shaft axis for thereby moving said brush toward and away from the mold surface of said mold half on said one mold part, whereby said rotatable brush is capable of being moved by said adjusting means and said swinging means about substantially the entirety of said mold surface for selectively or entirely cleaning said surface including mold pockets, while avoiding any obstructions on said surface during cleaning, and facilitates ejection of the molded workpieces.

2. In the mold press according to claim 1, wherein said arm is mounted between opposite ends thereof on said shaft.

3. In the mold press according to claim 2, wherein said extendable means is pivotally connected at one of said ends, and said brush is mounted at an opposite end of said arm.

4. In the mold press according to claim 1, wherein said means for rotating said brush comprises a drive motor mounted on said arm, and an endless belt operatively extending between said motor and said brush for rotating same.

5. In the mold press according to claim 4, wherein said brush is mounted on one side of said arm facing said mold surface, and said drive motor and belt are located on an opposite side of said arm.

6. In the mold press according to claim 1, wherein said means for swinging said shaft comprises a drive motor mounted on said guide plate.

7. In the mold press according to claim 1, wherein said guide means comprise a pair of spaced guide rods.

8. In the mold press according to claim 1, wherein said adjusting means comprise a piston and cylinder unit, the piston of which is connected to said guide plate.

* * * * *